July 6, 1954  F. V. BURMAN  2,682,954
MULTIPLE LEAF ROTARY FILTER
Filed Sept. 2, 1949  3 Sheets-Sheet 2

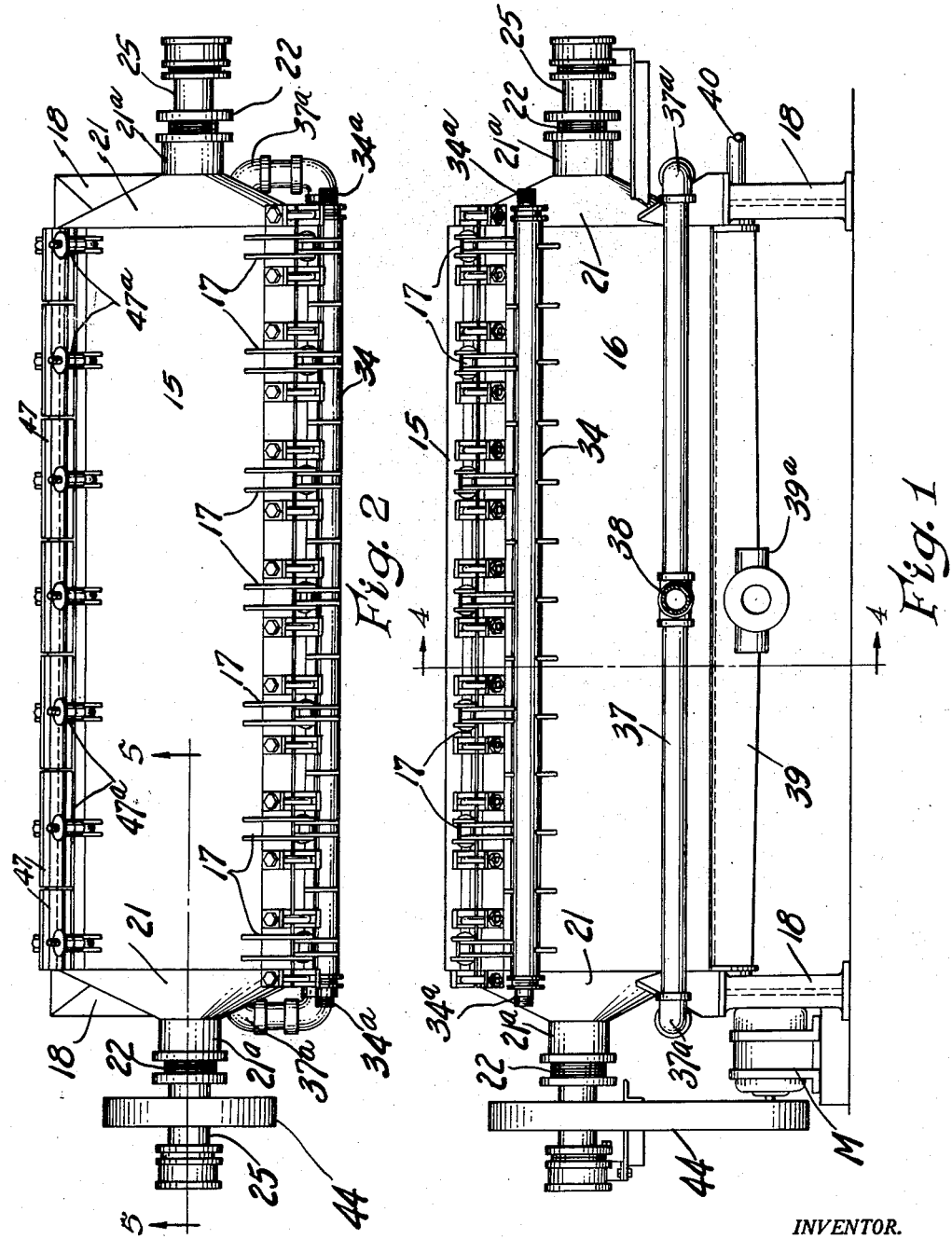

INVENTOR.
Frank V. Burman.
BY
Frank C. Burman.
ATTORNEY

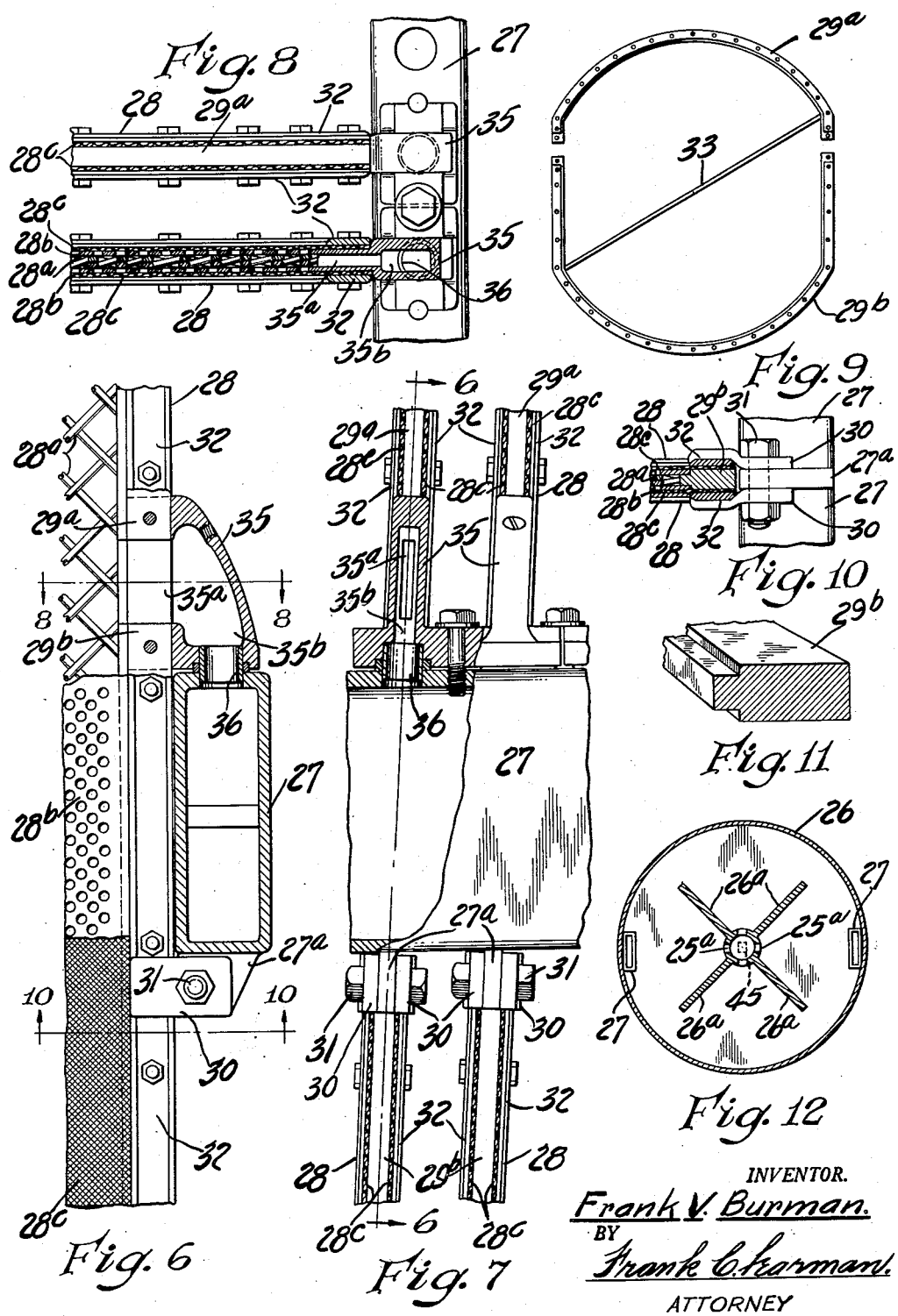

Patented July 6, 1954

2,682,954

UNITED STATES PATENT OFFICE 2,682,954

MULTIPLE LEAF ROTARY FILTER

Frank V. Burman, Phelps, Wis.

Application September 2, 1949, Serial No. 113,709

1 Claim. (Cl. 210—200)

This invention relates to filter presses of large capacity for filtering juices or other fluids containing ingredients which deposit or have a tendency to deposit and cake on filter screens. While capable of wide general use, it is particularly applicable to high capacity filter presses for filtering sugar juices and the like.

In most types of filter presses extensively utilized at this time, it is difficult and laborious to remove or replace one of the filtering elements. This is particularly true of filter devices having revolvable filtering elements.

It is an object of my invention to provide a filter press provided with revolvable filtering elements any one of which may be readily removed from the filtering assembly and its casing without dismantling the assembly or disconnecting the other filtering elements from the supports and mountings for the same.

It is a further object to provide a filter press which may be constructed at relatively low cost; which has exceedingly high efficiency for the work intended and which utilizes a minimum number of parts.

More specifically it is an object to provide a rotary filter assembly comprising a number of filtering elements mounted between and secured to a plurality of supporting members which extend longitudinally of the assembly and rigidly connect the journals of the same whereby any one or more of such filtering elements may be readily detached for repair or replacement without disconnecting the journals, supporting members or other essential parts of the assembly.

A further object is the provision of a filter press of the type described wherein the longitudinal supporting members for the removable filtering elements constitute filtrate eduction manifolds for receiving the filtrate from the filtering elements and for conducting such filtrate to discharge outlet or outlets of the device.

Still another object is the provision of a filter of the rotary element type which causes an efficient agitation of the fluid treated thus preventing the rapid formation of a cake or deposit on the elements and increases the filtering capacity of the machine.

Another object is the provision of a filter press wherein a filter assembly of the class described having individually removable filtering elements is combined with a sectional casing having a portion or section which may be readily disconnected from the balance thereof to enable the filtering elements to be individually removed from the casing and the assembly for repair or replacement.

These and other objects and advantages of the invention will be more fully set forth in the following description made in connection with the accompanying drawings, in which like reference characters refer to similar parts throughout the several views and in which:

Fig. 1 is a side elevation of a commercial embodiment of my invention;

Fig. 2 is a plan view of the same;

Fig. 6 is a sectional view taken along the line 6—6 of Fig. 7 showing the communication between one of the filtering elements and one of the filtrate eduction manifolds;

Fig. 7 is a fragmentary side view with some portions broken away of a portion of the filter assembly detached;

Fig. 8 is a view partly in cross section taken along the line 8—8 of Fig. 6 and showing an efficient filter element and discharge connection in elevation;

Fig. 9 is a detail view showing a suitable frame for a filtering element;

Fig. 10 is a detail sectional view taken on the line 10—10 of Fig. 6 showing the attachment of one of the filtering elements to a bracket provided by the supporting eduction manifold;

Fig. 11 is a fragmentary, perspective view showing the construction of the frame for the filtering element shown in Fig. 9, and Fig. 12 is a cross section taken on the line 12—12 of Fig. 5.

Figure 3:
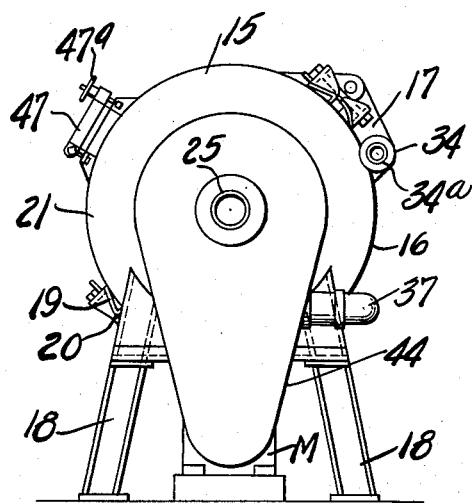
Fig. 3 is an end elevation.
Figure 4:
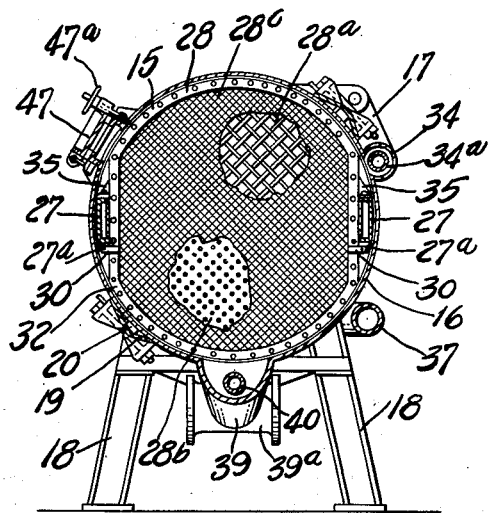
Fig. 4 is a cross section taken on the line 4—4 of Fig. 1.

The embodiment of the invention illustrated includes a large cylindrical drum or casing comprising upper and lower shell sections 15 and 16 respectively, hinged together by a series of heavy hinge elements 17 to permit the upper section to be swung back in position to expose the entire upper portion of the casing and the filter assembly contained therein. The lower casing section 16 is rigidly mounted on upright standards 18 and is provided with suitable sealing locks 19 which secure the sections 15 and 16 together along their unhinged edges to form a sealed joint along the line 20.

Truncated conical casing ends 21 are connected or integrally formed with the lower casing section 16 and rigidly carry, axially and outwardly disposed, sleeves 21a wherein the bearings 22 as well as the packing gland 23 for the journals 25 of the rotary filter assembly are mounted. The hinged casing 15 is in the form of a plate or arcuate cross sections and the arcuate edges thereof are provided with suitable sealing strips 24 for engagement with the edge of the truncated conical ends 21 of the drum.

The rotary filter assembly is mounted upon a pair of tubular journals 25 having fixed to the inner ends thereof which project for some distance inwardly of the ends of the drum, truncated conical headers 26 which collect the filtrates from special eduction filtrate manifolds 27 and which communicate through ports 25a with the respective tubular journals 25 the interiors of which constitute outlet passages for the filtrates, one being axially disposed at each end of the drum. The eduction filtrate manifolds 27 are of relatively heavy construction and are connected for communication with the several filtering elements designated as entireties by the numeral 28. A plurality of manifolds 27 are provided, as shown, a pair being outwardly disposed in diametrically opposite relationship adjacent the peripheral wall of the drum.

These eduction filtrate manifolds 27 constitute the means for supporting and connecting together in spaced relationship the multiplicity of filtering elements 28 and being spaced apart at opposite sides of the drum make possible the elimination of an axial shaft or the like which heretofore has been utilized as a mounting means for rotary filter elements, and these filter elements are set at a slight angle with relation to a vertical line to provide for better, more efficient washing and operation. The said spaced manifolds provide an attachment and supporting means for the several filtering elements to permit said elements or any thereof to be readily removed for repair or replacement without dismantling the filter assembly or the casing or drum. Any suitable filtering elements may be utilized which are properly shaped to properly fit the interior of the drum and which have preferably straight side portions for attachment to the eduction manifolds 27. The form of filtering element illustrated comprises a central reticulated sheet 28a which may be constructed from relatively heavy woven metal screen at each side of which is disposed a perforated metal screening plate 28b which preferably has a smooth exterior surface.

Cloth screens 28c cover the exterior surfaces of the metal screen plates 28b. The several filtering screens 28b and 28c as well as the reticulated core sheet 28a are clamped together by a suitable annular frame, which frame as shown comprises a rigid annular frame body comprising upper and lower sections 29a and 29b respectively, said sections having rabbeted inner edges for receiving the perforated sheets 28b.

The lower section 29b of the frame body is shaped in the form of a U and the upper ends of the legs of the U are rigidly and detachably connected or clamped to depending attachment ears 27a rigidly connected to or integrally formed with the eduction filtrate manifolds 27. As shown, clamping plates 30 engage the rim of one side of the filtering element frame securing the same to one of the ears 27a by means of a clamping bolt 31. A pair of thin clamping rings 32 are associated with each filtering element covering the marginal edges of the outside or cloth screens 28c at both sides of the element, and these are secured to the annular frame by bolts or other suitable means. A diagonally disposed spacer bar 33 connects opposite sides of the frame, one end thereof preferably being connected with the lower frame section 29b and the opposite end being connected with the upper frame section 29a, space being provided in the heavy central screen 28a.

The ends of the two frame sections 29a and 29b are spaced a short distance apart to provide a filtrate passage for removal of the filtered fluids from the filter element. As clearly shown in Figs. 6, 7 and 8, the said spaced ends of the frame sections are bolted to the upper and lower portions of a rigid discharge member 35 which is slotted at 35a to communicate with the interior of the filter element and which forms a discharge passage 35b communicating with one of the eduction manifolds 27 and detachably connected therewith by means of a fitting or nipple 36. Each filter element is provided with one of the rigid discharge members 35 at each side thereof, these members rigidly connecting together the two sections of the frame and constituting disconnectible means for effecting communication between the interior of the filter element and the two eduction filtrate manifolds which extend longitudinally of the filter assembly.

The juices or fluids to be treated are introduced into the machine through both ends thereof, as shown, an intake manifold 37 being provided at one end of the drum and having elbow sections 37a at the ends thereof which communicate with the interior of the drum through the conical ends 21. The entering fluids, under pressure, are thus discharged against the revolving headers 26 and are uniformly distributed around the inner flaring edge of the headers into the drum. A juice supply pipe 38 is connected with the intake manifold 37.

A trough or channel 39 is provided at the bottom of the drum extending longitudinally thereof and having open communication with the interior of the drum and is shown as having a central sump portion 39a which may be connected with a drain pipe for removal of waste materials. To agitate the solid matter within this channel 39, I provide a longitudinally extending spray pipe 40 which is connected with a suitable source of water supply under pressure. To wash out and flush the interior of the drum between the several filtering elements I provide, as shown, a spray bar 34a connected with a source of water under pressure and disposed in a channel or elongated chamber 34 which is secured to the lower section 16 of the drum in communication therewith. Spray bar 34a extends longitudinally of the drum and has a multiplicity of ports directed downwardly and diagonally with reference to the cross section of the drum.

The revolving filter assembly may be driven in any suitable manner. As shown, I provide a variable speed drive mechanism including a motor M mounted below the drum of the device and provided with a drive gear 41 as usual; a similar gear 42 is provided on the journal 20 and a chain 43 serves to drivingly connect the members 41 and 42, the entire assembly being mounted in a housing 44 as usual.

Figure 5:
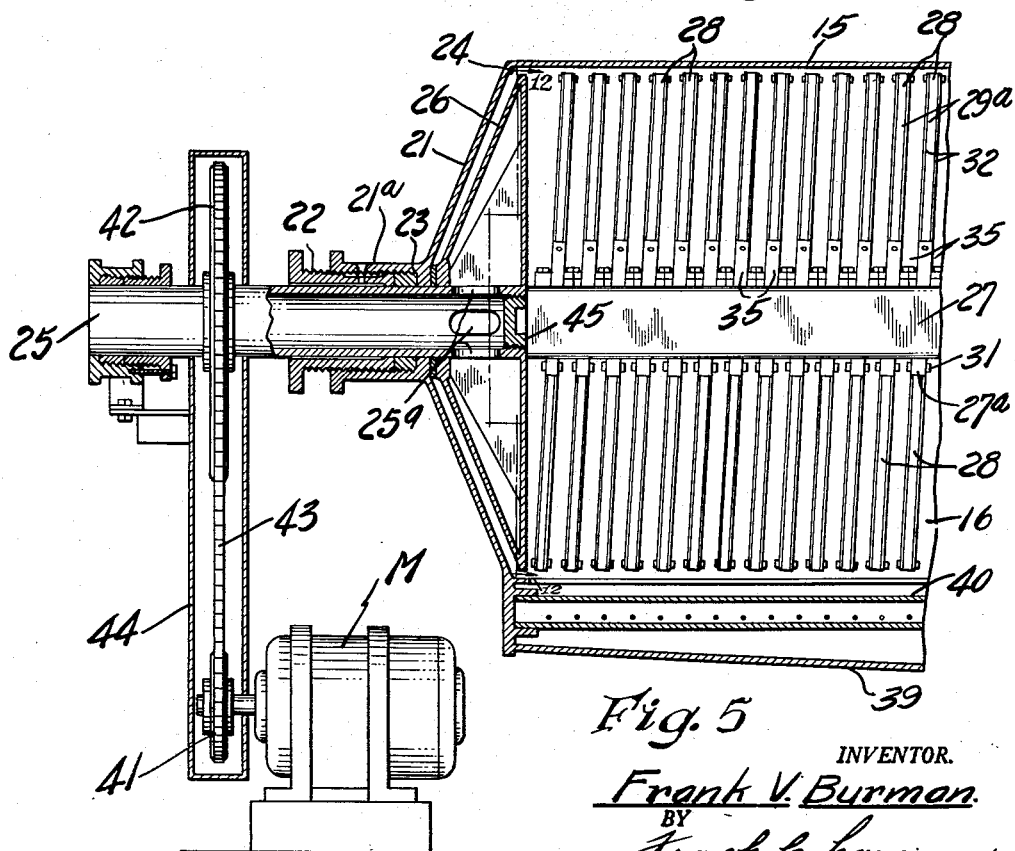
Fig. 5 is a vertical section taken on a somewhat larger scale, substantially on the line 5—5 of Fig. 2.

The tubular journals 25 at the ends of the rotary filter assembly are similar with the exception that the journal shown in detail in Fig. 5 is extended sufficiently for attachment and connection of the power transmission mechanism for driving the device. Each of the journals has its inner end closed by a removable plug member 45. The longitudinally disposed filtrate manifolds 27 communicate with the interior of the filtrate collection headers 26 and are rigidly connected with the broad inner ends thereof. As shown in Fig.

12, the two manifolds 27 extend through apertures formed in headers 26 and are welded or otherwise rigidly secured by sealed joint connection with the inner faces of such headers. Filtrate educted from the filtering elements thus flows through the discharge members 35 into the manifolds 27 and flows in both directions through such manifolds into the headers 26. Headers 26 communicate with the interior of the journal members 25 through the ports 25a at the inner end portions of the journal members. To strengthen the headers 26, a series of radially disposed, triangular ribs 26a may be integrally formed with the inner side of the header members, the outer edges of said ribs being spaced from the conical peripheral wall of the header. I provide a plurality of suitable inspection doors 47 mounted over apertures provided in the hinged section 15 of the drum and as shown hinged to the section and having suitable clamping mechanism 47a for effecting a tight seal of the doors with the hinged section.

Operation

Juices or fluids to be filtered are pumped or otherwise supplied, under pressure, to my machine through the supply pipe 38 which connects with the intake manifold 37. These fluids enter both ends of the drum through the truncated conical end members 21 and are discharged against the revolving conical surfaces of the headers 26 of the filter assembly and are uniformly distributed or spread by the revolving conical members, entering the filtering chamber of the drum under pressure around the inner and flaring edges of the headers. The pressure of the supplied fluid causes the same to be filtered into the many revolving filtering elements provided, the rotary movement of such elements assuring a uniform pressure application to the screens of the filter with the attendant relatively slow formation of a uniformly deposited cake upon the filtering elements. The revolution of the filtering assembly also, through centrifugal force, causes the filtrates to be moved outwardly and educted through the passages 35a which communicate with the discharge members 35 at opposite sides of each filtering element. The filtrates pass into the filtrate eduction manifolds 27 at opposite sides of the filter assembly and are then collected in the headers 26 and are discharged through the outlet passages formed in the tubular journal members 25.

The waste materials which are separated by the filtering action and which tend to settle are collected in the longitudinal channel 39 and are then drained off through the sump 39a. With my construction, no conveyor is necessary to remove such waste materials as the spray tube 40 discharges a multiplicity of streams of water under pressure which agitates such materials causing them to move centrally from the ends of the drum to the drain sump.

From time to time the formation of the cake on the several filtering elements will be observed by opening the several inspection doors 47 and the condition of the filtering elements can thus be ascertained.

When it is necessary to remove one or more of the filtering elements for cleaning, repair or replacement, this can be readily accomplished without dismantling or disconnecting the filtering assembly by releasing the clamping locks 19 which secure the free edge of the hinged section to the lower section 16 of the drum and the hinged section 15 may then be swung open on the heavy hinge elements 17. Filtering elements to be removed may be quickly disconnected from the supporting filtrate manifolds 27 by disconnecting the bolts 31 and clamping members 30 and the filtering element or elements may then be lifted out of the drum without disconnection of the journal members, the manifolds or the other filtering elements.

The angle mounting of the filter elements is of major importance because of the washing advantages presented thereby. When the machine is filtering, it is driven at approximately one-half R. P. M., but when washing, the speed is increased to approximately twenty-five (25) R. P. M. This angular mounting of the filter elements produces a more violent turbulence similar to that set up in a washing machine when the machine is speeded up for the washing operation, and the elements are cleaned better, and much more rapidly than can be done with the conventional mounting.

From the foregoing description, it will be seen that I have provided a comparatively simple and highly efficient filter press of the rotary filter type which may be constructed at relatively low cost and makes provision for a very uniform discharge of the fluids to be filtered into the filtering chamber.

It will further be seen that I have provided a filter press wherein the filtering elements may be readily removed from the filtering assembly and from the drum without disconnection of the journal members, filtrate collection elements and without dismantling the casing or drum.

It will, of course, be understood that various changes may be made in the form, details, proportions and arrangement of the parts without departing from the scope of my invention, which, generally stated, consists in a device capable of carrying out the objects above set forth, and in the novel parts and combinations of parts disclosed and defined in the appended claim.

What I claim is:

In a filter press, a drum having a cylindrical inner periphery defining a filtering chamber and having a truncated conical end, a rotary filtering assembly including a plurality of filter elements mounted in said drum with its peripheral surface disposed in close working relation to the inner periphery of said drum, said filter elements being of general circular shape with oppositely disposed straight edged portions a conical distributing member at one end of said filter assembly disposed in close working relation to the truncated conical end of said drum, a pair of filtrate eduction manifolds of rectangular cross-section extending longitudinally adjacent the straight edged portions of the filter elements and connected for communication with the interior of each of the filter elements of the filter assembly, means for introducing liquid to be filtered through said conical end of said drum and directed toward said distributing surface, and a filtrate collection header within one end of the drum, said drum having a longitudinal channel at the bottom portion thereof, said channel being inclined from its ends to a central sump for drainage, and a spray pipe in said channel connected with a source of water supply under pressure, said spray in cooperation with said channel and rotary assembly being adapted to agitate solid material in the lower portion of said drum and cause its movement and drainage through said sump.

(References on following page)

References Cited in the file of this patent

UNITED STATES PATENTS

| Number | Name | Date |
|---|---|---|
| 1,249,835 | Salisbury | Dec. 11, 1917 |
| 1,734,652 | Sweetland | Nov. 5, 1929 |
| 1,793,289 | Naugle | Feb. 17, 1931 |
| 1,967,070 | Walker | July 17, 1934 |
| 2,093,967 | Keene | Sept. 21, 1937 |
| 2,184,451 | Genter | Dec. 26, 1939 |
| 2,207,618 | Grill et al. | July 9, 1940 |
| 2,381,453 | Hunziker | Aug. 7, 1945 |

FOREIGN PATENTS

| Number | Country | Date |
|---|---|---|
| 68,289 | Germany | Apr. 29, 1893 |
| 452,139 | France | May 8, 1913 |

OTHER REFERENCES

The "Auto" Filter, Bulletin No. 104-A, Suchar Process Corp., N. Y.